United States Patent

Schluessler et al.

(10) Patent No.: US 8,561,178 B2
(45) Date of Patent: Oct. 15, 2013

(54) CHIPSET BASED CHEAT DETECTION PLATFORM FOR ONLINE APPLICATIONS

(75) Inventors: Travis T. Schluessler, Hillsboro, OR (US); Stephen D. Goglin, Hillsboro, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 959 days.

(21) Appl. No.: 11/998,822

(22) Filed: Nov. 30, 2007

(65) Prior Publication Data

US 2009/0144825 A1    Jun. 4, 2009

(51) Int. Cl.
*G06F 21/00*    (2013.01)

(52) U.S. Cl.
USPC ............................................ 726/22; 360/251

(58) Field of Classification Search
USPC .......................................................... 726/23
See application file for complete search history.

(56) References Cited

U.S. PATENT DOCUMENTS

| | | | |
|---|---|---|---|
| 7,169,050 B1 * | 1/2007 | Tyler | 463/42 |
| 7,288,027 B2 | 10/2007 | Overton | |
| 7,480,656 B2 | 1/2009 | Harris et al. | |
| 7,517,282 B1 | 4/2009 | Pryor | |
| 7,792,960 B2 | 9/2010 | Goglin et al. | |
| 2003/0028780 A1 * | 2/2003 | Burnett | 713/180 |
| 2004/0093372 A1 | 5/2004 | Chen et al. | |
| 2008/0004107 A1 | 1/2008 | Nguyen et al. | |
| 2008/0182659 A1 * | 7/2008 | Sabella et al. | 463/29 |
| 2009/0143144 A1 | 6/2009 | Schluessler et al. | |
| 2009/0144415 A1 | 6/2009 | Goglin et al. | |

OTHER PUBLICATIONS

Kim, et al., "Detection of Auto Programs for MMORPG's", Springer Berlin, A12005, Advances in Artificial Intelligence Vo. 3809, 2005, pp. 1281-1284.*
Schluessler, et al., "Is a Bot at the Controls? Detecting Input Data Attacks", published for Netgames '07, Sep. 19-20, 2007, 6 pages.
Schluessler, et al., "Is a Human at the Controls?—Detecting Input Data Attacks", [The paper was submitted on for inclusion in the USENIX Security Symposium, Aug. 6-10, 2007, Boston Mass (not accepted for inclusion in Symposium)], 16 pages.
"4.5 million copies of EULA-compliant spyware", by Greg "hoglund" at rootkit.com, Oct. 6, 2005, webpage available at: http://www.rootkit.com/blog.php?newsid=358.
Kim, et al., "Detection of Auto Programs for MMORPG's", Springer Berlin, AI 2005, Advances in Artificial Intelligence vol. 3809, 2005, pp. 1281-1284.

* cited by examiner

*Primary Examiner* — Gilberto Barron, Jr.
*Assistant Examiner* — Devin Almeida
(74) *Attorney, Agent, or Firm* — Doug Ryder; Ryder, Lu, Mazzeo and Konieczny, LLC

(57) ABSTRACT

In general, in one aspect, an interface chipset includes at least one interface to receive user commands from input devices, filters to monitor the received user commands and to copy the user commands associated with at least a subset of the input devices, and an isolated execution environment. The isolated execution environment is to provide a secure communication link between an on-line application and a remote service provider. The isolated execution environment is also to detect at least some subset of user command modifications, on-line application code modifications, and on-line application process flow modifications. The isolated execution environment is further to notify the remote service provider when a modification is detected via the secure communication link.

20 Claims, 7 Drawing Sheets

CHIPSET BASED CHEAT DETECTION PLATFORM FOR ONLINE APPLICATIONS

BACKGROUND

The online video game market continues to grow. Online games may be played on personal computers (PCs) or gaming consoles (e.g., XBOX LIVE ®). The online game communicates with a remote server to provide interaction with other users. PCs are open systems and therefore are susceptible to hacking. Hacking online games played on PCs may enable users to cheat while playing the game.

The cheating may include simulating (e.g., inserting) user commands, and/or deleting or modifying actual user commands (input data modification). An input modification program may be utilized to modify the input stream (user commands) received and processed by the game application. For example, certain games require a player to aim and shoot at various objects or other players. The input modification program may be able to determine the exact location of the target and automatically aim and shoot the player's gun with inhuman accuracy and speed. Some games require players to perform repetitious tasks in order to obtain certain items (game currency) and/or to advance to new levels. The input modification program may perform the repetitive tasks for the user without the user needing to play the game and perform the functions. This allows the user to accumulate wealth, skills or other game features faster and vastly easier than the rest of the players in the game.

The cheating may include intercepting communications between the game application run on the PC and the remote server for the game and deleting, modifying or delaying actual communications between the game application and the remote server (network communication modification). A communication modification program may be used to modify communications between the game application and the remote game server and/or to intercept communications from the game server and take appropriate action. For example, if during game play of an action game the player shots at another user the game application will provide communications to the remote server indicating that this event occurred. The communication modification program may intercept the update and replace the update with a different update (e.g., one that ensures the shot will hit the closest other user). By way of another example, the communication modification program may provide updates to the remote server that that certain repetitive tasks required to obtain items or advance play were performed even though they were not.

The cheating may include intercepting communications from the remote server and taking appropriate actions prior to the communications being processed by the on-line application (network communication intercept). A communication intercept program may be used to intercept the communications and take actions prior to the on-line game processing the communication. The actions may include instructing the on-line game to take certain actions or disconnecting communications between the on-line game and the remote server. For example, if the communication is that another user shot at the player the communication intercept program may provide commands to the on-line game to duck prior to the communications regarding the shot are processed. Alternatively, the communication intercept program may disconnect communications between the on-line game and the remote server so that the shot can not be processed.

The cheating may include modifying the on-line game application (software modification). The cheating may also include modifying pointers to external code utilized outside of the on-line game application's code (program control flow modification) to point to cheating code or skip certain code (e.g., anti cheat code). Modifying the on-line game application code or program control flow may enable the player to take actions or see things they would not normally be able to or to turn off cheat detecting software. For example, the modification may make walls in a game transparent so that the player can see what is on the other side.

BRIEF DESCRIPTION OF THE DRAWINGS

The features and advantages of the various embodiments will become apparent from the following detailed description in which.

DETAILED DESCRIPTION

Figure 1:
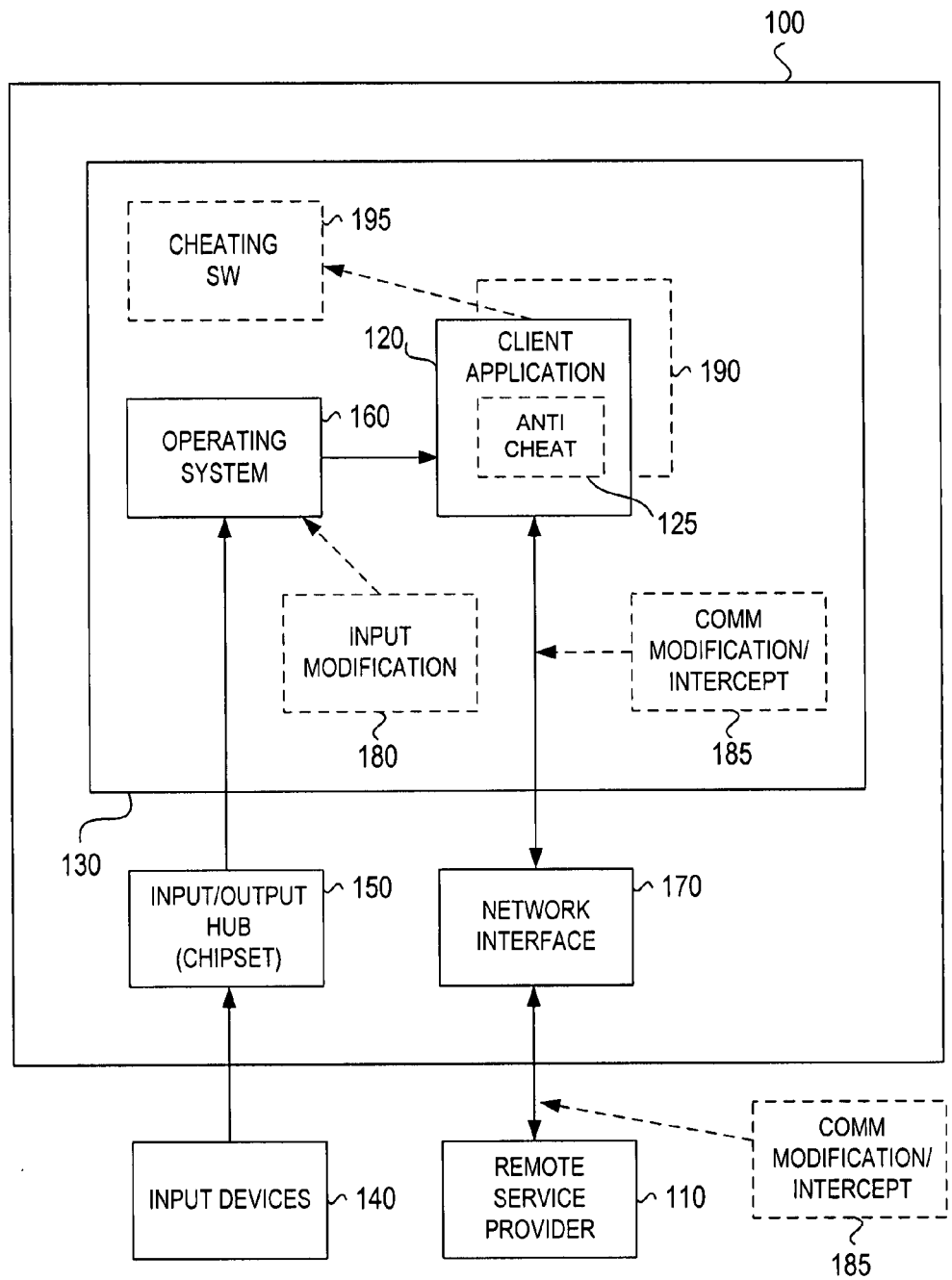
FIG. 1 illustrates an example on-line application configuration, according to one embodiment.

FIG. 1 illustrates an example on-line game configuration. A user plays a game on their computer 100 and interacts with other users via an application server 110 (remote service provider). A client version of the on-line game (client application) 120 is run on a central processing unit (CPU) 130 in the computer 100. The user may utilize an input device 140 (e.g., mouse, keyboard, joystick) to enter commands (e.g., scroll mouse, press keys) in order to play the game. Data capturing the user commands (e.g., bit strings corresponding to the user command) is received by an input/output control hub (ICH) 150 (chipset). The ICH 150 forwards the data to an operating system (OS) 160 for processing.

The OS 160 utilizes appropriate drivers to convert the data (e.g., bit strings) to corresponding "human" commands (e.g., the 'A' key was pressed, the mouse was moved left) and forwards the "human" commands to the client application 120. The client application 120 processes the "human" commands received in order to update/advance the game (modify the game state). Updates to the game are communicated from the client application 120 to the remote service provider (RSP) 110 over a communication network (e.g., Internet) via a network interface 170 (e.g., modem, wireless card, Ethernet cable port, coaxial cable port). The client application 120 may include anti-cheating software 125 to detect cheating software that may attempt to modify the game play in some fashion.

An input modification cheat application 180 may be run on the CPU 130 and provide commands to the client application 120. The input modification 180 may monitor game play to determine the commands necessary to increase score (e.g., aim more accurately, fire faster) or to perform repetitive tasks (e.g., dig for gold). The input modification 180 may delete user commands (e.g., remove commands associated with an accidental shot), may modify user commands (e.g., aim a shot more accurately), and/or may add user commands (e.g., shoot more often). The input modification 180 need not receive any commands from the user and can simply play the game in place of the user by providing data associated with user commands directly to the OS 160 for processing and the user commands are then provided by the OS 160 to the client application 120. The client application 120 is unaware that the commands received may not be from a user (e.g., have been inserted or modified) or that user commands may have been deleted.

A communication modification/intercept cheat application 185 may be run on the CPU 130 and monitor communications between the client application 120 and the remote service provider 110. The communication modification/intercept 185 may also be located external to the computer 100. The communication modification/intercept 185 may provide updates (insert communications) to the RSP 110 that certain activities have occurred in the client application 120 (e.g., redundant tasks have been completed) that have not. When the communication modification/intercept 185 detects game updates being communicated from the client application 120 to the RSP 110 that it does not want to be communicated it may delete the update (e.g., simulate a communications failure before the player is to be killed) or modify the update (e.g., adjust the trajectory of a shot from another player to ensure it does not hit the cheating player).

When the communication modification/intercept 185 detects commands from the RSP 110 that may adversely affect game play (e.g., bomb detonation) the communication modification/intercept 185 may provide commands to the client application 120 (e.g., leave house) or may discontinue/interrupt communications (e.g., disable NIC 170, shut off client application 120) between the client application 120 and the RSP 110 so that the adverse effects do not occur.

The client application 120 may be modified 190 and/or the program control flow may be modified to point to code outside of the client application 120 that modifies and/or corrupts the on-line application in some fashion (cheating software 195). The modified client application 190 or the cheating software 195 pointed to by the modified program control flow may effect the way that the client application 120 is played and/or displayed to the user so that the user has an advantage over other players (e.g., display transparent walls) or may disable the anti-cheating software 125.

Figure 2:
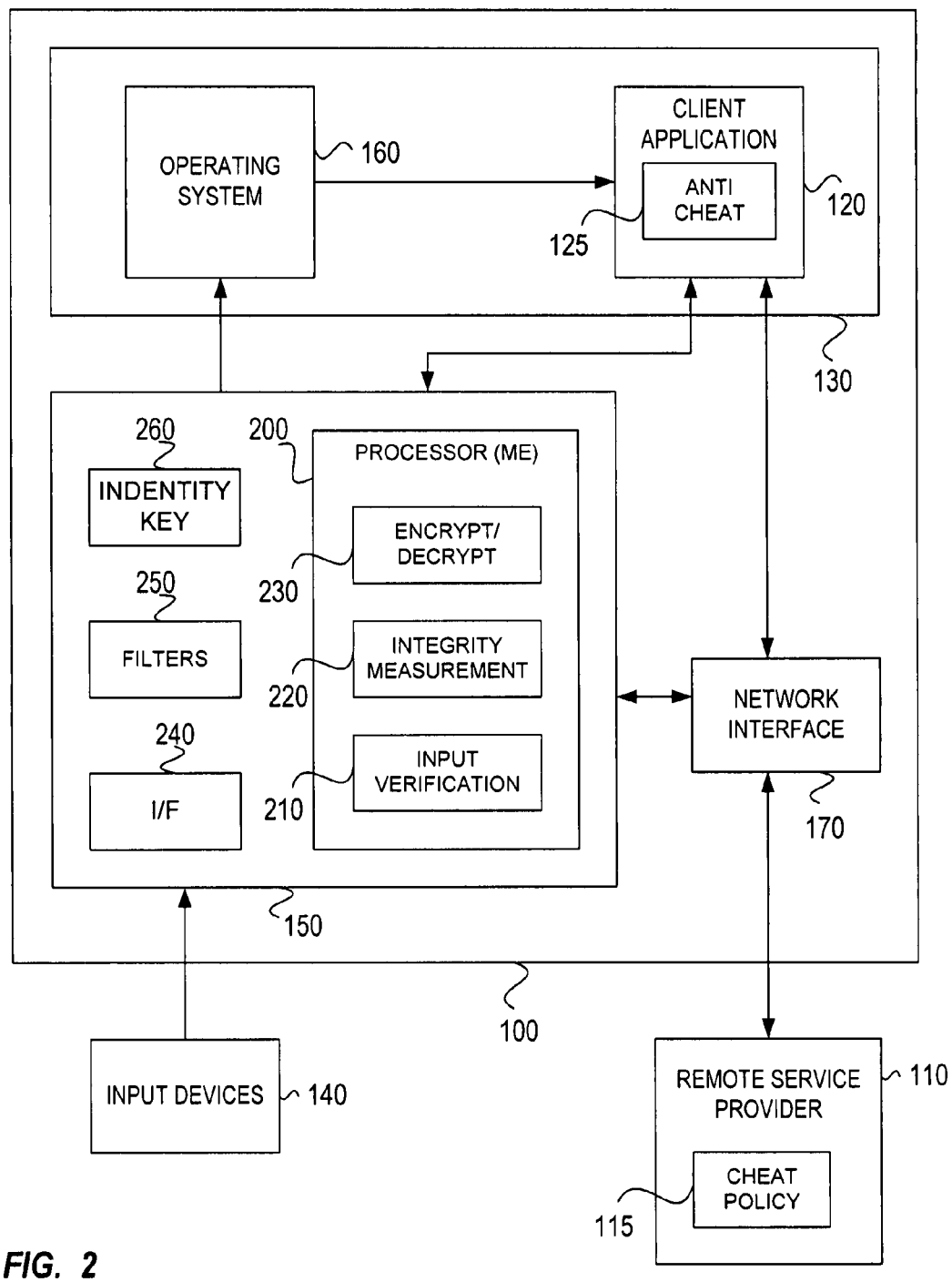
FIG. 2 illustrates an example on-line game configuration utilizing a chipset to detect the various online application cheats, according to one embodiment.

FIG. 2 illustrates an example on-line game configuration utilizing the ICH 150 to detect the various online application cheats. The configuration is similar to the configuration discussed with respect to FIG. 1. The RSP 110 may include a cheat policy module 115. The ICH 150 includes a processor 200 that is independent of and inaccessible to the operating systems and other applications running on the CPU 130 (the processor 200 is an isolated execution environment). The processor 200 may be a manageability engine (ME) such as that contained in Intel ® chipsets with Active Management Technology. The ME 200 will only run software provided by trusted parties. The ME 200 may be programmed to detect and report various online cheats. For example, the ME 200 may be programmed to perform input verification (input verification module 210), to perform software integrity measurements (integrity measurement module 220), and to encrypt and decrypt communications (encrypt/decrypt module 230).

The ICH 150 may include an interface 240 to receive data associated with commands entered by a user on the input devices 140. The ICH 150 may include filters 250 to filter the data received from the input devices 140, and may have an identity key 260 stored therein that is inaccessible to the platform owner (e.g., stored in a fuse array on the ICH 150). The identity key 260 can be used to attest to the identity of the ICH 150 and can be used as the basis for an asymmetric cryptographic certificate, to establish a private connection to the RSP 110. Once the ICH's identity is attested to the RSP 110, the ICH 150 can then use a negotiated session key to encrypt communications prior to it being sent across the network. The converse is true for decryption.

The ME 200 (input verification module 210) may be utilized to detect input modification cheating by comparing the commands received from the filters 250 to the commands processed by the client application 120. If the comparison determines that the commands received and commands processed are not the same then the commands must have been derived from a non-human source, such as the input modification cheat 180.

The client application 120 may provide configuration data to the ME 200 (the input verification 210). The configuration data may include identification of acceptable type of input devices 140 (e.g., mouse and keyboard may be used, track ball can not), and any allowable input translations (e.g., convert one keystroke to multiple keystrokes) permitted by the game. The configuration data may also include information about the RSP 110 (e.g., IP address) so that the ME 200 can communicate directly therewith.

The input verification module 210 may use the configuration data to configure the filters 250 to look for data (e.g., bit strings associated with a command or action) from the accepted input devices 140. The interfaces 240 receive data from the input devices 140 and pass the data through the filters 250. When game play is active, the filters 250 monitor the data received to determine if the origin is from an accepted input device 140. If the filters 250 determine the data is not from an accepted input device, the data is simply forwarded to the OS 160. If the filters 250 determine the data is from an accepted input device, the filters 250 make a copy of the data for the input verification module 210 and also forward the data to the OS 160.

The client application 120 receives and processes application commands in order to update/advance the game (modify the game state). In normal operation the application commands would be based on data from the input devices. However, the application commands may be modified in some fashion by an input modification cheat application as discussed above with respect to FIG. 1. The client application 120 captures the application commands received and processed to update the game and forwards them to the input verification module 210.

The input verification module 210 may convert the data received from the filters 250 into user commands (e.g., change bit strings to mouse presses). The conversion includes use of any allowable input translations. The input verification module 210 may then compare the user commands generated by the input verification module 210 to the application commands received from the client application 120. If the commands do not match the input verification module 210 may provide the RSP 110 and the client application 120 with notification of non-matching commands. The input verification module 210 may provide the notification based on a single instance of non-matching commands or some algorithm (e.g., 5 consecutive commands, 50% of commands over a defined interval). The notification may simply indicate non-matching has occurred or may provide details regarding the level of non-matching.

In order to ensure that the non-matching notification is not intercepted and discarded the notification may be encrypted using the encrypt/decrypt module 230. The encrypt/decrypt module 230 may utilize the identity key 260 to attest to the identity of the ICH 150 to the RSP 110 and to establish a private connection to the RSP 110. Once the connection is established the encrypt/decrypt module 230 can use a negotiated session key to encrypt the notification prior to it being sent across the network.

The RSP 110 receives the encrypted notification from the ME 200 and decrypts the notification. The RSP 110 (e.g., the cheat policy module 115) makes a determination if cheating is occurring based on the notification. The cheat policy module 115 may determine cheating is occurring after receipt of a single notification from the ME 200 or may base the decision on some algorithm (e.g., reach threshold level of notifications/mismatches in a defined period). If the cheat policy module 115 determines that cheating is occurring (e.g., utilizing input modification cheats) the cheat policy module 115 may take appropriate action (e.g., provide warning, discontinue play, ban user, ban game play from that machine, notify other players). The action taken by the cheat policy module 115 may depend on, for example, the level of cheating determined, if cheating has previously been detected for the user or from the machine, and/or if previous action has been taken against the user/machine.

Figure 3:
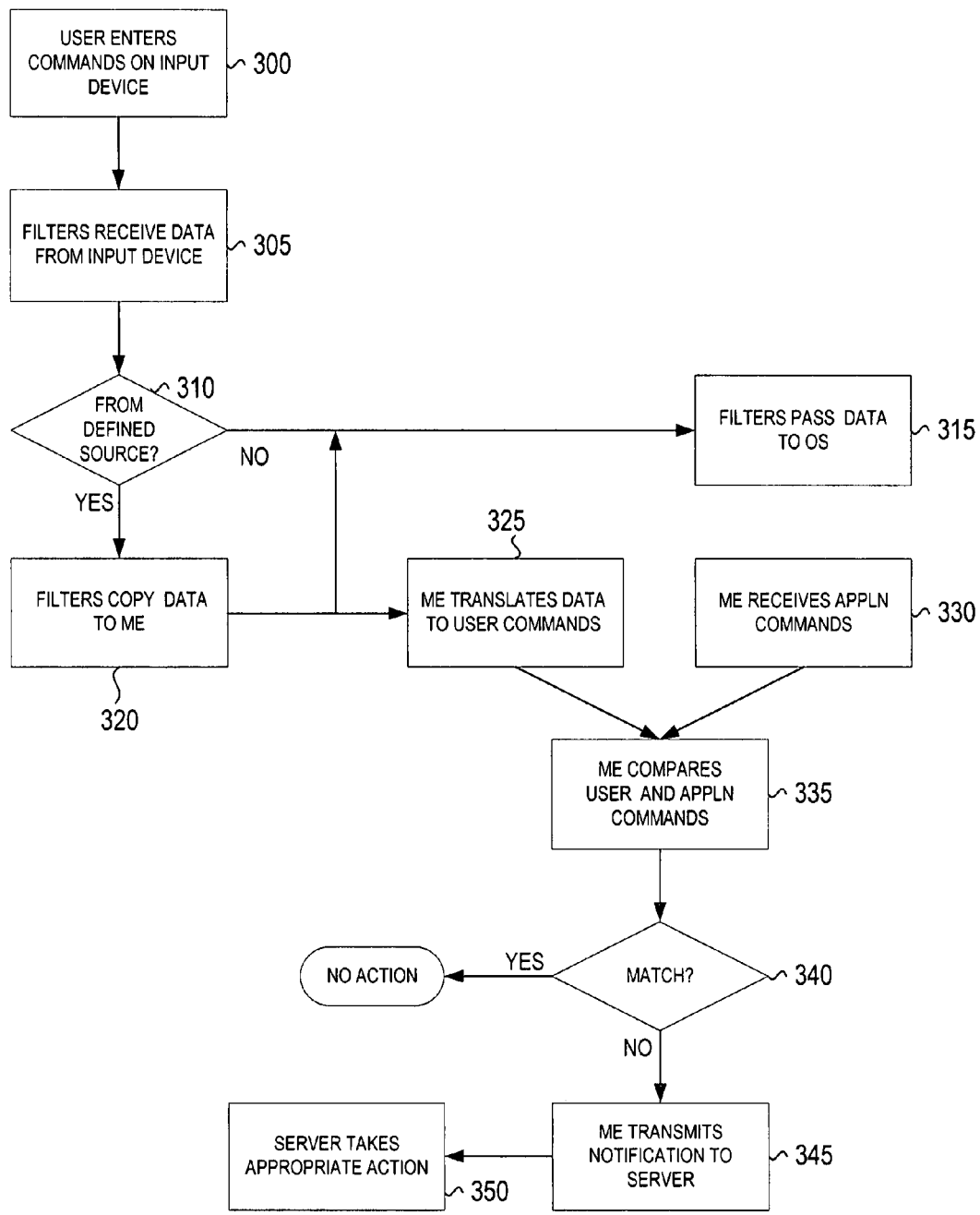
FIG. 3 illustrates an example process flow for user command verification, according to one embodiment.

FIG. 3 illustrates an example process flow for user command verification. The user enters commands on their input device during game play 300. The filters receive data associated with the user commands from the input device 305. The filters determine if the data received is from a defined (allowed for game play) input device 310. If the data received is not from a defined input device 310 No, the data is passed to the OS for processing 315. If the data received is from a defined input device 310 Yes, the filters duplicate the data and send the duplicate data to the ME 320 and pass the original data to the OS 315.

The ME (the input verification module) translates the data received from the filters into corresponding user commands 325. The ME receives application commands from the client application 330. The application commands are the commands that the client application processed to update the game state. The ME (the input verification module) compares the user commands and the application commands received from the client application 335. If the commands match 340 Yes, no action is taken. If the commands do not match 340 No, the ME (the input verification module) notifies the RSP regarding the mismatch 345. The notification is encrypted using the encrypt/decrypt module. The cheat policy module of the RSP determines the appropriate action to be taken based on the notification 350.

Referring back to FIG. 2, communications between the client application 120 and the RSP 120 may be routed through the ME 200 to prevent communication modification/intercept cheating as use of the identity key 260 and the encrypt/decrypt module 230 provides a secure communication link between the ME 200 and the RSP 110. The identity key 260 and the encrypt/decrypt module 230 may also be used to establish a secure communication link between the client application 120 and the ME 200. The secure communication links between the client application 120 and the ME 200 and the ME 200 and the RSP 110 establish a secure link between the client application 120 and the RSP 110 via the ME 200. The secure communication link may prevent the communication modification/intercept cheats from detecting communication between the client application 120 and the RSP 110 as the cheats will not be able to decrypt the messages. Additionally, since the cheats will not have established their identity they may not be able to insert communications.

In addition to the secure connection between the client application 120 and the RSP 110 via the ME 200, an insecure connection may to be established directly between the client application 120 and the RSP 110. The direct insecure connection may be used by the client application 120 to communicate data that does not need to be protected against cheating. This could include data not related directly to game play such as system configuration information.

In order to verify the identity and integrity of the client application 120 the client application 120 may be identified by a cryptographic signature that is generated based on the code and a public private key pair. A signature that is based on the code results in the signature of the client application changing if the code is changed. A signature using a public private key pair means that any one with the public key may verify a signature but only those with the private key can generate a valid signature. The ME 200 (integrity measurement module 220) may verify the identity and integrity of the client application 120 by computing a signature for client application 120 using the public key and comparing it to the expected (valid cryptographic) signature. If the signatures do not match a software modification cheat may have been detected.

Rather than having a single signature, the client application 120 may have a cryptographic signature generated for various segments of the code (segment signatures) based on the code segments and a public private key pair. If segment signatures are utilized the integrity measurement module 220 will need to know which segments of the client application 120 to generate the signatures for. The client application may provide an integrity manifest that identifies the appropriate segments of the code as well as the expected signatures for those segments to the ME 200.

In order for the integrity measurement module 220 to compute the signatures for the client application 120 it needs to have access to the code (needs to be able to have direct memory access (DMA) to the code). The code for the client application 120 will not be stored contiguously in physical memory. Accordingly, the code for the client application 120 will need to be modified to allow the program to execute in the physical memory locations in which it is stored. The change to code to reflect the physical locations is known as relocation fix-ups. Since the code that the integrity measurement module 220 will generate signatures for is based on the relocation fix ups the generated signature will not match the expected signature. Accordingly, when the code is loaded into memory the client application will record the relocation fix-ups and will include the relocation fix-ups in the integrity manifest. The integrity measurement module 220 will back out the relocation fix-ups when computing the signatures.

The integrity manifest may be identified by a cryptographic signature that is generated based on the integrity manifest and a public private key pair. The integrity measurement module 220 may generate a signature for the integrity manifest using the public key and compare the computed signature to the expected signature in order to verify the identity and integrity of the integrity manifest. By verifying the integrity of the integrity manifest the data contained within the integrity manifest including the signature for the client application or the signatures for the segments is assumed valid. Validating the integrity manifest prevents cheaters from modifying the code and inserting an appropriate expected signature for the modified code in the integrity manifest.

Figure 4:
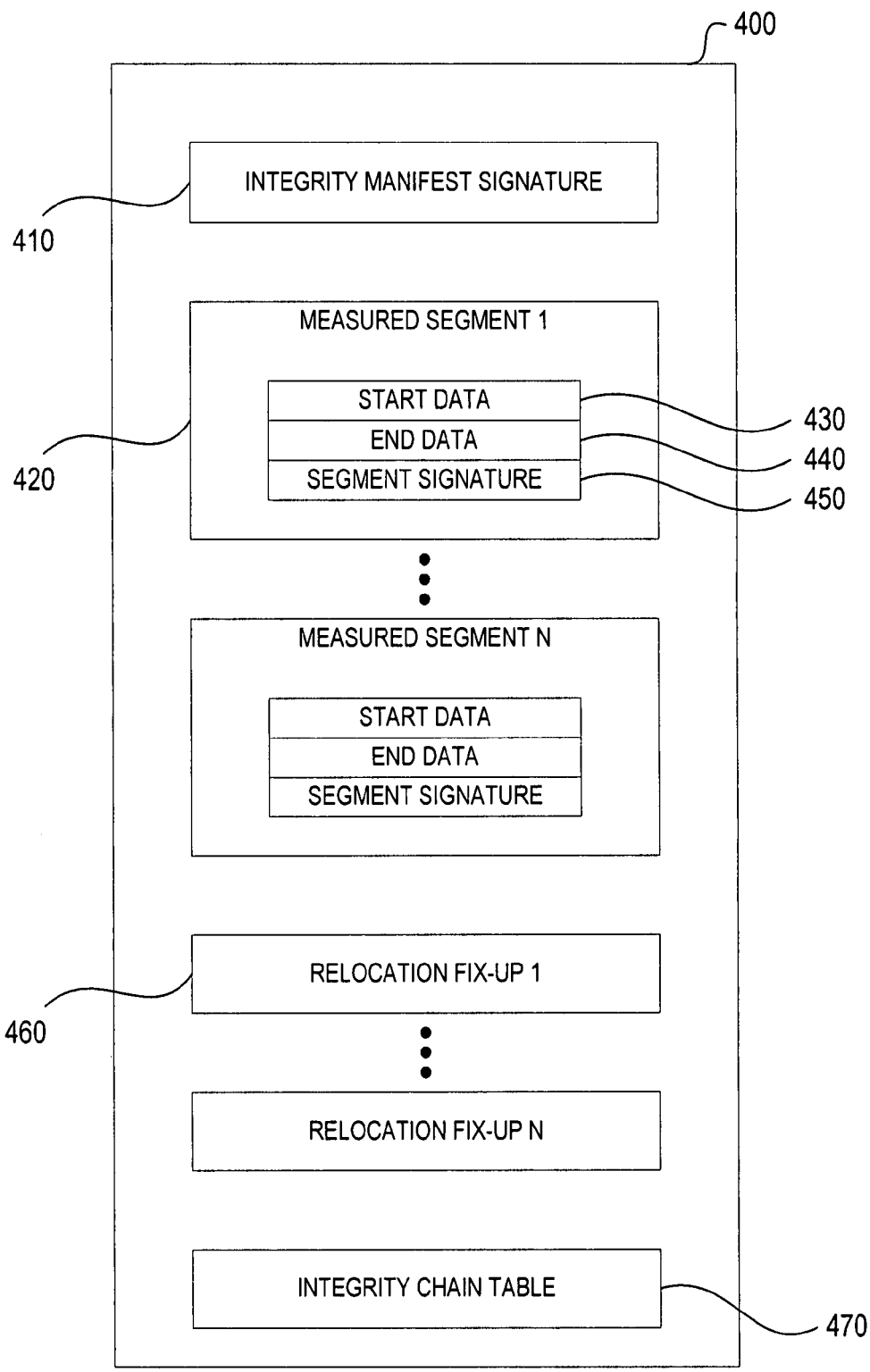
FIG. 4 illustrates an example integrity manifest for a client application, according to one embodiment.

FIG. 4 illustrates an example integrity manifest 400 for a client application. The integrity manifest includes a cryptographic manifest signature 410 that is based on the integrity manifest 400 and a public private key pair. The integrity manifest 400 also includes details for measured segments of code 420 such as start data 430, end data 440 and expected signature 450. The integrity manifest 400 also includes relocation fix-up data 460 for the various segments. The integrity manifest may also include an integrity chain table 470 (to be discussed in more detail with regard to validating the process flow of the client application).

Figure 5:
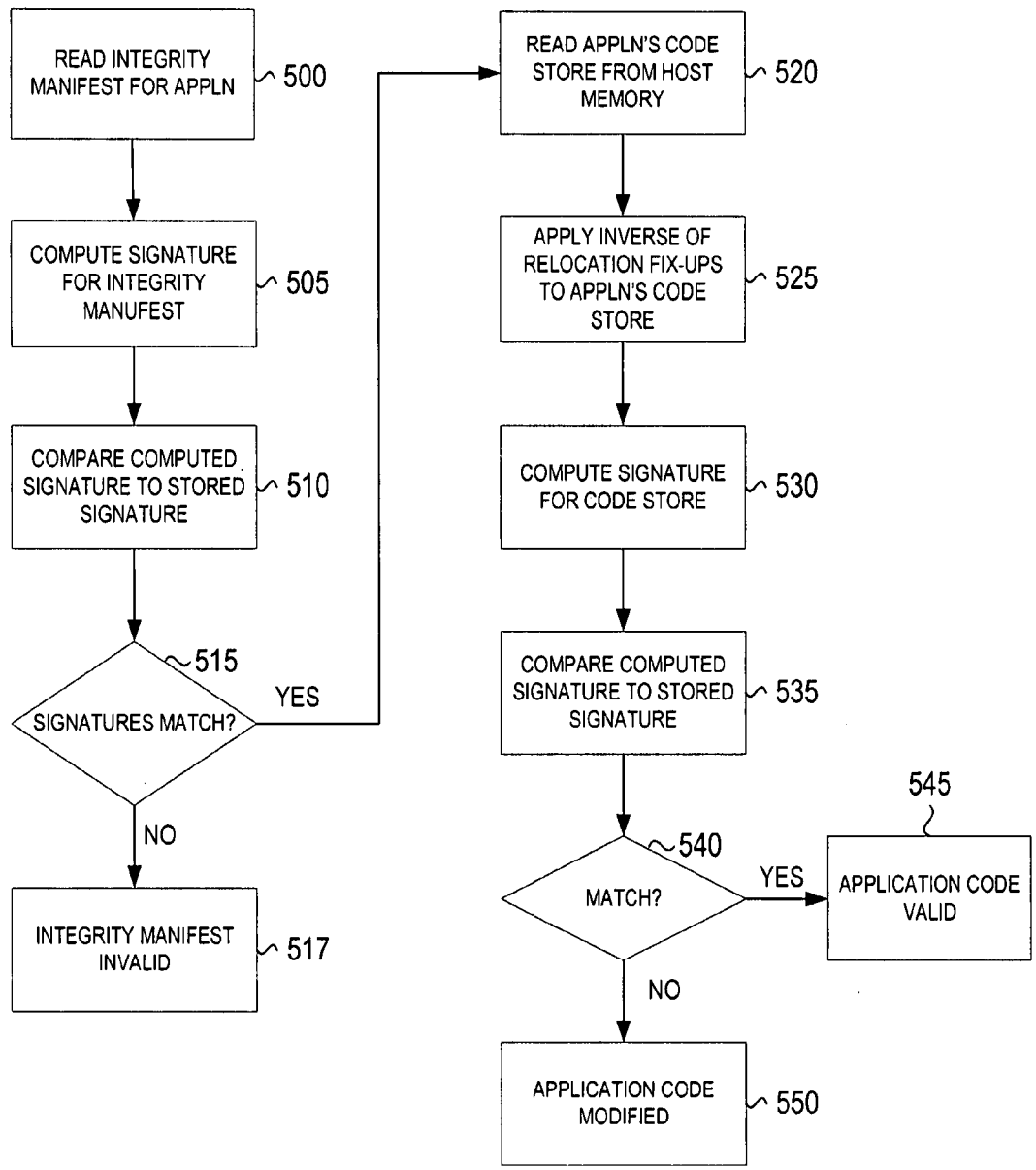
FIG. 5 illustrates an example process flow for an integrity measurement module validating the identity and integrity of a client application, according to one embodiment.

FIG. 5 illustrates an example process flow for the integrity measurement module validating the identity and integrity of the client application. The integrity manifest for the application is read 500. The signature for the integrity manifest is computed 505. The computed signature is compared to the expected signature 510. If the signatures do not match 515 No, the integrity manifest is not valid as it may have been modified 517. If the integrity manifest is not validated then the identity of the client application can not be verified. The integrity measurement module may take appropriate action including notifying the RSP.

If the signatures match 515 Yes, the identity of the client application is validated and the application code store is read from the host memory 520. The inverse of the relocation fix-ups is applied to the code 525. A signature is computed for the code 530. The computed signature is compared to the expected signature 530. If the signatures do not match 540 No, the client application is not valid as the code may have been modified 550. The integrity measurement module may take appropriate action including notifying the RSP regarding the modification. The cheat policy module of the RSP determines the appropriate action to be taken with regard to game play at this computer based on the modification notification. If the signatures match 535 Yes, the client application is validated and game play can continue 545.

If the client application included multiple segments defined in the integrity manifest a determination may be made as to whether additional segments remain to be verified and if additional segments remain the process may return to 520. Once all the segments have been validated the client application is deemed to be valid.

After the initial verification of the client application, the integrity measurement module may compute the signature for the code segments based on the location of the code in memory (without backing out fix-ups) and these signatures may be stored in the ME for future comparisons. This enables the integrity measurement module to compute and compare signatures in the future without needing to back-out the fix-ups (525). It should be noted that since the signature generated by the ME is not based on the private key that it can only be used for comparisons within the ME and not as the signature for the client application that needs to be generated by the application developer using the private key.

After the initial verification the client application may be validated periodically (e.g., once a day/week, every four hours of use), and/or in an event-driven manner (e.g., transmission of certain data to the remote server). These verifications may be performed on the overall client application or may be performed on selected segments. For example, in event driven verification the verification may be limited to the segment of code for performing that function.

It should also be noted that the validity of the integrity manifest (500-515) need not be performed each time the client application or segments of code for the client application is validated. In fact, the validity of the manifest could be independent of the validation of the client application or segments thereof. The validity of the integrity manifest may be validated periodically (e.g., once a week, every 10 times the client application or portions thereof are validated).

When the client application is running it may reference other programs and/or libraries that are not part of the code for the client application (external code). The external code may be defined, for example, within the executable code in an import address table (IAT), or in an interrupt dispatch table (IDT) that points to the appropriate external code. In order to ensure that the pointers to the external code have not been not modified to point to cheating software or to skip certain code, the various program control flows (process flows) defined in the code may be included in the integrity manifest. The program control flows may be defined in an integrity chain table (e.g., 460 of FIG. 4) within the integrity manifest.

Figure 6:
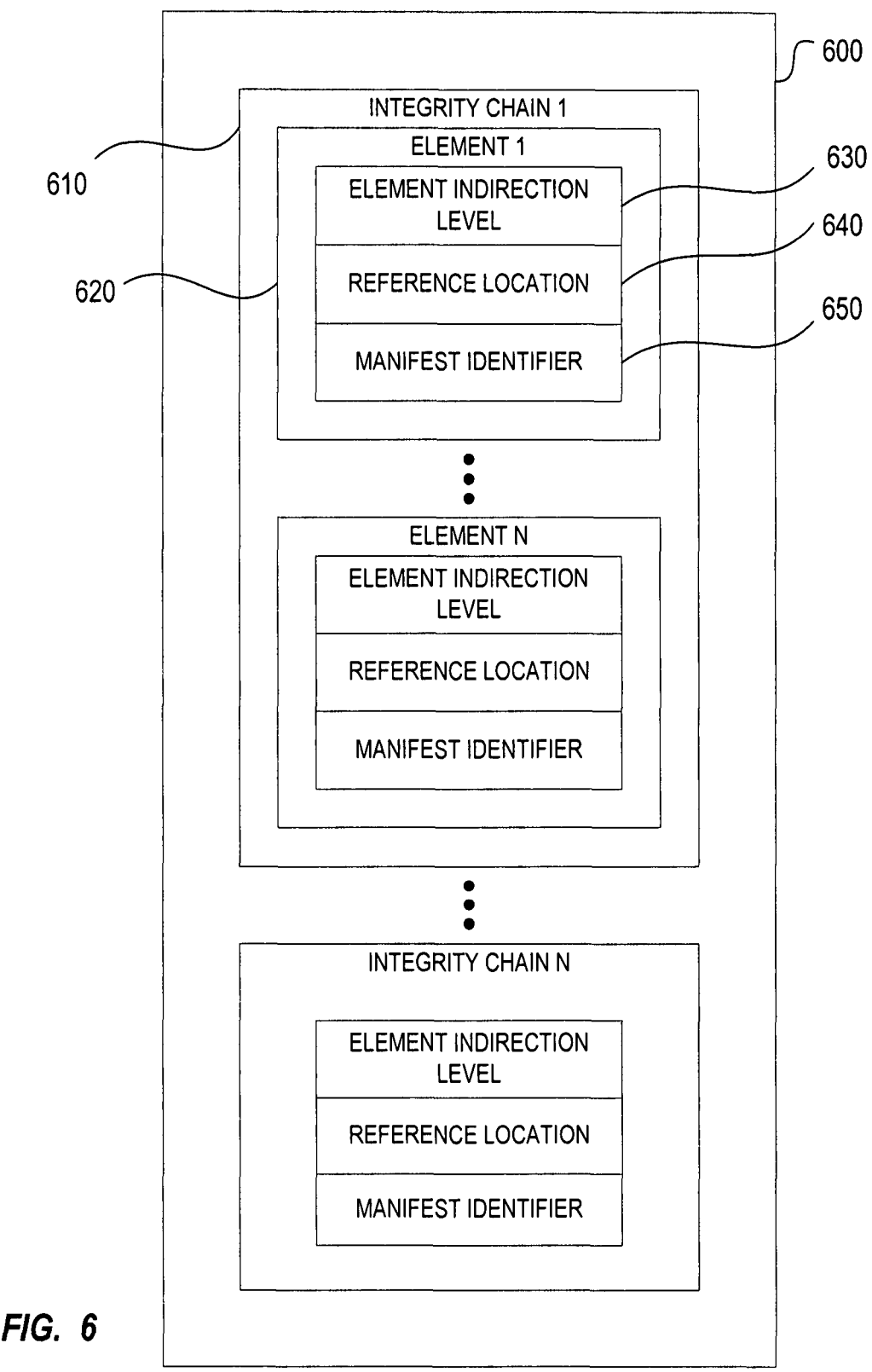
FIG. 6 illustrates an example integrity chain table for a client application, according to one embodiment.

FIG. 6 illustrates an example integrity chain table 600 for a client application. The integrity chain table 600 may include details for various process flows (integrity chains) 610. The integrity chains 610 may include multiple linked elements 620, where an element is a program referenced in the chain. For each element 620 within a chain 610, the element 620 may define an element indirection level 630, a reference location 640, and an identifier 650. The element indirection level 630 specifies the level of indirection (e.g., number of function pointers that must be traversed) needed to reach this element of the chain. For example, a value of 1 could represent a direct call into a function in a program's address space and a value of 2 could be used to traverse into an unrelated program. The reference location 640 specifies the location of the reference to this element (e.g., the location in memory where the pointer is located). The identifier 650 specifies the manifest corresponding to this element of the chain. The manifest for the element (external code) may include a cryptographic signature for the code and may include links to any external code utilized thereby, if any. The manifest and the links may be protected by cryptographic signatures.

The integrity measurement module may validate the process flow by computing a signature for the code referenced in the defined reference location 640 and comparing the calculated signature to the expected signature. If the pointer pointed to the defined code in the process flow and the code has not been modified then the signatures should be the same. If the pointer points to different code than expected (e.g., points to cheating code, skips anti-cheating code) or the code has been modified the signatures will not match. It should be noted that if the referenced code includes links to additional code that the additional code should be validated as well (signature generated and compared to expected signature in manifest). The manifest for the referenced code should identify the location of the additional code and identify the manifest for the additional code.

Figure 7:
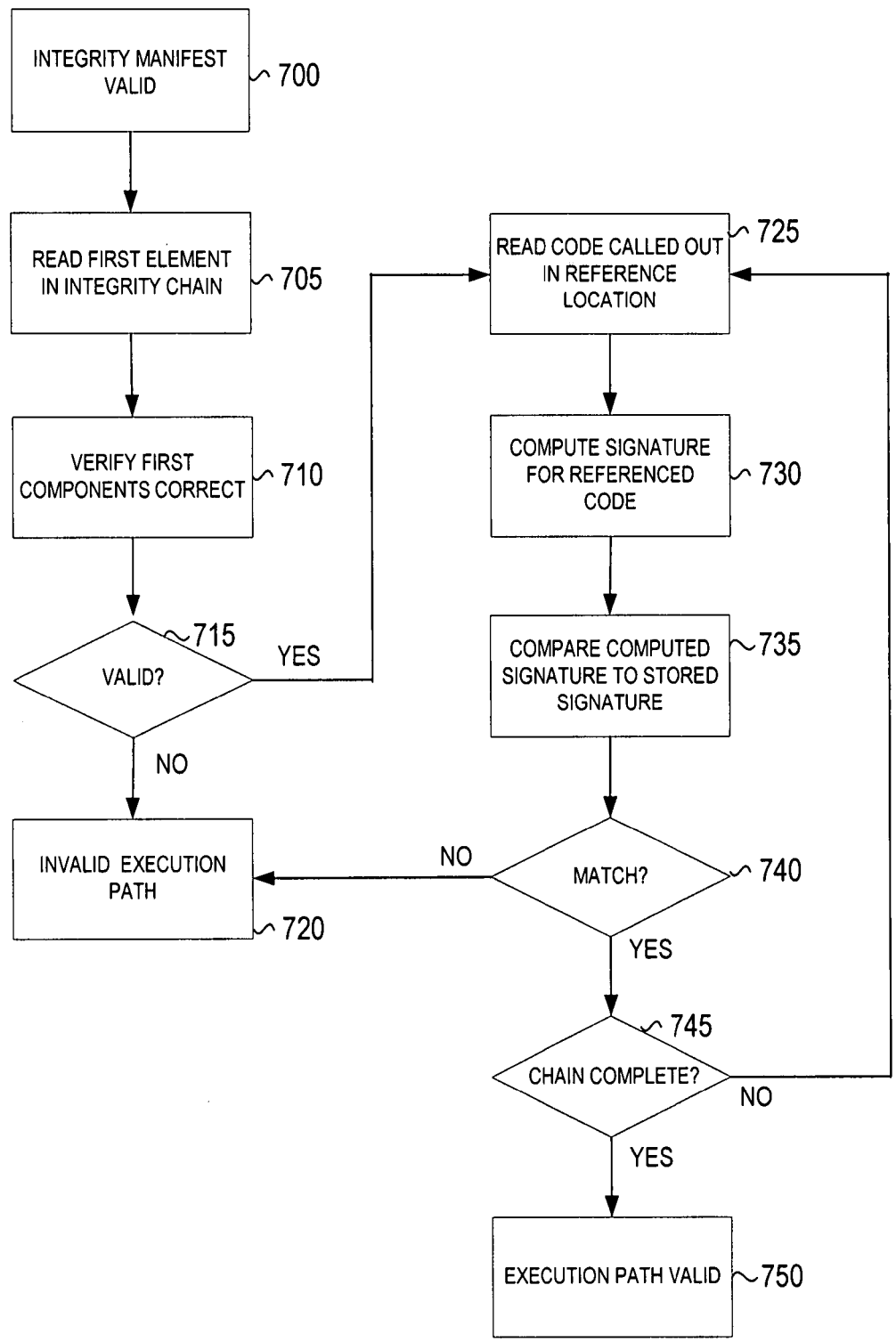
FIG. 7 illustrates an example process flow for the integrity measurement module validating the integrity of the client application process flow, according to one embodiment.

FIG. 7 illustrates an example process flow for the integrity measurement module validating the integrity of the client application process flow. Initially, the manifest for the client application will be verified 700. The first element in an integrity chain will be read from the integrity chain table in the integrity manifest 705. The first element will be verified to make sure it is correct 710. For example, if the first element is an IDT register a determination will be made that the first element is indeed the IDT register. If the first element is not valid 715 No, then a determination may be made that the process flow has been modified in some fashion and the execution path (process flow) is invalid 720. The integrity measurement module may take appropriate action including notifying the RSP regarding the modification. The cheat policy module of the RSP determines the appropriate action to be taken with regard to game play at this computer based on the modification notification.

If the first element is valid 715 Yes, the code called out in the reference location of the first element is read 725. A signature for the reference code is calculated 730 and the calculated signature is compared to the expected signature defined in the integrity chain table in the integrity manifest 735. If the signatures do not match 740 No, then a determination may be made that the process flow has been modified in some fashion and the execution path (process flow) is invalid 720. If the signatures match 740 Yes, a determination is made as to whether the chain is complete 745. If the chain is not complete (there are more elements in the chain) 745 No, then the process returns to 725. If the chain is complete (no more elements in the chain) 745 Yes, then the execution path is valid.

If the client application included multiple integrity chains defined in the integrity chain table a determination may be made as to whether additional chains remain to be verified and if additional chains remain the process may return to 705. Once all the chains have been validated the client application process flow is deemed to be valid.

After the initial verification the client application process flow may be validated periodically (e.g., once a day/week, every four hours of use), and/or in an event-driven manner (e.g., transmission of certain data to the remote server). These verifications may be performed on the overall client application process flow or may be performed on selected portions. For example, in an event driven verification the verification may be limited to the process flow (integrity chain) for performing that function.

It should also be noted that the validity of the integrity manifest (700) need not be performed each time the client application process flow or certain integrity chains are validated. In fact the validity of the manifest could be independent of the validation of the client application process flow. The validity of the process flow (FIG. 7) is illustrated as being independent of the validity of the client application (FIG. 5) but is not limited thereto. The processes may be performed at the same time or as part of one process.

The operation of the client application 120 may be modified by utilizing exception handlers of the CPU 130. Exception handlers take control of the CPU 130 away from the currently executing application (e.g., client application 120) if certain events occur. For example, a debug handler may take control of the CPU 130 from the client application 120 if a certain area of memory is accessed. A hacker could enable the debug handler by modifying a certain debug register (e.g., to define break points). The hacker could then utilize the debug handler to analyze and hack the client application 120 without having to modify the client application code, registers, or process flow.

The ME 200 is unable to access the debug registers of the CPU 130. However, the client application 120 generates system management reports including interrupt reports for the system manager of the CPU. The client application 120 can have the reports generated during the course of normal execution of the program, or it can be done at random intervals from a dedicated thread within the client application 120. The system manager may decode the interrupt reports as a debug register verification requests and read the values of the debug registers. The system manager may provide the reports (e.g., debug register values) to the integrity measurement module 220. The integrity measurement module 220 can analyze the report to determine if break points have been defined in the registers (a debugger has been activated). If a debugger has been activated the integrity measurement module 220 can determine if the client application 120 is being debugged (e.g., if the break points are in the linear address space of the client application 120). The integrity measurement module 220 may also determine what debugger has been activated (e.g., whether it is the standard OS debugger or some other debugger).

When activation of an exception handler is detected the integrity measurement module 220 may take the appropriate action including notifying the RSP 110. The cheat policy module 115 of the RSP determines the appropriate action to be taken with regard to game play at this computer based on the notification. The cheat policy for the application may not allow the debugger to ever be active during game play, may only enable the OS debugger to be used, or may not allow the debugger to be active if it is analyzing the client application.

The system of FIG. 2 utilized the ICH 150 having an embedded processor (ME) to perform the various cheat detection and reporting methods. The various embodiments are not intended to be limited thereto. Rather, an add-in card (such as a PCI Express card) having an embedded general purpose processor only capable of running sanctioned code and memory not accessible to the operating system or other programs running on the CPU (an isolated execution environment) may be utilized to perform the user command validation. The card would also have inputs for receiving the input data and filters for copying the data from appropriate input devices and passing the data to the processor. The input devices used for game play would be required to plug into this card.

A graphics card having a graphics processing unit (GPU) could also be used if the GPU was an embedded isolated execution environment processor that ran the various cheat detection programs. The necessary inputs and filters would also need to be added to the graphics card. The input devices would need to be plugged into the graphics card in order for the user command verification to work.

The cheat platform could utilize some combination of a chipset having an isolated execution environment processor, additional cards having an isolated execution environment processor, or graphics card having an isolated execution environment processor, with the various isolated execution environment processors performing different functions.

It should be noted that the system of FIG. 2 was discussed with respect to a computer 100 having a single processor (CPU) 120 but is not limited thereto. Rather, the computer 100 could include multiple CPUs or a single multi-core CPU. The client application 120 could be run on one or more of the CPUs.

The various cheat detection and reporting modules were discussed with respect to the cheating occurring at the computer. It is possible that the cheating actually occurs at the RSP 110. That is, a hacker may modify the code or program flow of the software running on the RSP 110. Accordingly, the RSP may also utilize an isolated execution environment processor to validate the software and program control flow of the application running thereon and to provide secure communications between an on-line application running on a users computer and the RSP. The isolated execution environment processor may be included in a chipset, an add-in card, or a modified graphics card.

It should be noted that the cheat detection and reporting platforms have been described with specific reference to on line games but is not limited thereto. Rather, the cheat detection and reporting platform could be utilized with any client application that communicates with a remote server.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A system input/output (I/O) interface comprising
a processor, wherein the processor is independent and isolated from operating systems and applications running on a system processor for a system that the I/O interface is part of; and
processor accessible storage medium storing instructions, which, when executed by the processor cause the processor to
configure filters to monitor user commands received when an on-line application running on the system is active and to copy the user commands received that are associated with the on-line application, wherein the on-line application includes various code segments;
receive commands processed by the on-line application when the on-line application is active;
detect cheating in use of the on-line application by detecting user command modifications, wherein the user command modifications are detected by comparing user commands copied by the filters when the on-line application is active to the received commands processed by the on-line application when the on-line application is active;
read at least one code segment for the on-line application;
compute a cryptographic signature for at least one code segment using a public key of a private public key pair;
compare the computed cryptographic signature for the code segment to the expected cryptographic signature for the code segment, wherein the expected cryptographic signature for the at least one code segment was generated by the on-line application developer using a private key of the private public key pair; and
detect cheating in the online application by detecting on-line application code modifications based on non-matching of the computed signature for the code segment and the expected signature for the code segment.

2. The system I/O interface of claim 1, wherein the instructions when executed by the processor further cause the processor to notify a remote service provider when cheating is detected in the use of the on-line application, wherein the notification is provided via a secure communication link.

3. The system I/O interface of claim 1, wherein when the instructions are executed by the processor they further cause the processor to provide a secure communication link between the on-line application and the remote service provider by routing secure communications between the on-line application and the remote service provider through the processor.

4. The system I/O interface of claim 3, further comprising inaccessible memory to store an identity key, wherein the identity key is to enable the secure communication link.

5. The system I/O interface of claim 4, wherein the inaccessible memory is a fuse array.

6. The system I/O interface of claim 1, wherein when the instructions are executed by the processor they further cause the processor to receive configuration data from the on-line application, wherein the configuring of the filters is based on the configuration data.

7. The system I/O interface of claim 6, wherein the receiving user commands from the filters includes receiving data corresponding to the user commands and converting the data to the corresponding user commands, wherein the converting includes utilizing any input translations defined in the configuration data.

8. The system I/O interface of claim 1, wherein the user command modifications are detected when the user commands copied by the filters and the received commands processed by the on-line application do not match.

9. The system I/O interface of claim 1, wherein when the instructions are executed by the processor they further cause the processor to
read code for the on-line application;
compute a cryptographic signature for the on-line application code read by the processor using a public key of a private public key pair;
compare the computed cryptographic signature for the on-line application code to an expected cryptographic signature for the on-line application code, wherein the expected cryptographic signature was generated by the on-line application developer using a private key of the private public key pair; and
detect the on-line application code modifications based on non-matching of the computed signature for the on-line application code and the expected signature for the on-line application code.

10. A system input/output (I/O) interface comprising
a processor, wherein the processor is independent and isolated from operating systems and applications running on a system processor for a system that the I/O interface is part of; and
processor accessible storage medium storing instructions, which, when executed by the processor cause the processor to
configure filters to monitor user commands received when an on-line application running on the system is active and to copy the user commands received that are associated with the on-line application;
receive commands processed by the on-line application when the on-line application is active;
detect cheating in use of the on-line application by detecting user command modifications, wherein the user command modifications are detected by comparing user commands copied by the filters when the on-line application is active to the received commands processed by the on-line application when the on-line application is active;
read a manifest for the on-line application, wherein the manifest identifies certain parameters about the on-line application;
compute a cryptographic signature for the manifest read by the processor using a public key of a private public key pair;
compare the computed cryptographic signature for the manifest to an expected cryptographic signature for the manifest, wherein the expected cryptographic signature for the manifest was generated by the on-line application developer using a private key of the private public key pair; and
detect cheating in use of the on-line application by detecting on-line application code modifications based on non-matching of the computed signature for the manifest and the expected signature for the manifest.

11. The system I/O interface of claim 10, wherein the on-line application is stored in different segments of memory and code for the on-line application is modified to include relocation fix-ups to reflect the different segments of the memory that the code for the on-line application is stored so that the on-line application can run from the different segments of memory, wherein when the instructions are executed by the processor they further cause the processor to read the manifest for the on-line application, wherein the manifest identifies the relocation fix-ups;

read the code for the on-line application;

back out the relocation fix-ups from the code for the on-line application;

compute a cryptographic signature for the code after the relocation fix-ups are backed out using a public key of a private public key pair;

compute the computed cryptographic signature for the code to an expected cryptographic signature for the code, wherein the expected cryptographic signature for the code was generated by the on-line application developer using a private key of the private public key pair; and detect the on-line application code modifications based on non-matching of the computed signature for the code and the expected signature for the code.

12. The system I/O interface of claim 10, wherein the on-line application includes process flows to external code segments, and wherein when the instructions are executed by the processor they further cause the processor to detect cheating in use of the on-line application by detecting on-line application process flow modifications, wherein the on-line application process flow modifications are detected by reading the manifest for the on-line application, wherein the manifest identifies the external code segments defined in the process flow for the on-line application;

reading the external code segments;

computing cryptographic signatures for the external code using a public key of a private public key pair;

comparing the computed cryptographic signatures for the external code to expected cryptographic signatures for the external code segment, wherein the expected cryptographic signature for the external code segment was generated using a private key of the private public key pair; and detecting the on-line application process flow modifications based on non-matching of the computed signature for the external code and the expected signature for the external code.

13. The system I/O interface of claim 1, wherein when the instructions are executed by the processor they further cause the processor to detect cheating in use of the on-line application by detecting activation of an interrupt handler during use of the on-line application, wherein the activation of the interrupt handler is detected by receiving interrupt reports;

analyzing the interrupt reports to determine if any interrupt handlers have been activated;

gathering data about an activated interrupt handler, including at least some subset of, what interrupt handler is activated and is the on-line application being processed by the interrupt handler; and reporting the data to the remote service provider.

14. A system comprising
memory to store an on-line application;
a central processing unit (CPU) to run the on-line application;
at least one input device to enable a user to enter commands; and
an input/output (I/O) interface comprising
a processor, wherein the processor is independent and isolated from operating systems and applications running on the CPU; and
processor accessible storage medium storing instructions, which, when executed by the processor cause the processor to
configure filters to monitor user commands received when an on-line application running on the CPU is active and to copy the user commands received that are associated with the on-line application, wherein the on-line application includes various code segments;
receive commands processed by the on-line application when the on-line application is active;
detect cheating in use of the on-line application by detecting user command modifications, wherein the user command modifications are detected by comparing user commands copied by the filters when the on-line application is active to the received commands processed by the on-line application when the on-line application is active;
read at least one code segment for the on-line application;
compute a cryptographic signature for at least one code segment using a public key of a private public key pair;
compare the computed cryptographic signature for the code segment to the expected cryptographic signature for the code segment, wherein the expected cryptographic signature for the at least one code segment was generated by the on-line application developer using a private key of the private public key pair; and
detect cheating in the online application by detecting on-line application code modifications based on non-matching of the computed signature for the code segment and the expected signature for the code segment.

15. The system of claim 14, wherein the I/O interface further includes inaccessible memory to store an identity key, wherein the identity key is to enable secure communication links between the CPU and a remote service provider.

16. The system of claim 14, wherein when the instructions are executed by the processor they further cause the processor to read code for the on-line application;

compute a cryptographic signature for the on-line application code read by the processor using a public key of a private public key pair;

compare the computed cryptographic signature for the on-line application code to an expected cryptographic signature for the on-line application code, wherein the expected cryptographic signature was generated by the on-line application developer using a private key of the private public key pair; and detect the on-line application code modifications based on non-matching of the computed signature for the on-line application code and the expected signature for the on-line application code.

17. The system of claim 14, wherein when the instructions are executed by the processor they further cause the processor to read a manifest for the on-line application, wherein the manifest identifies certain parameters about the on-line application;

compute a cryptographic signature for the manifest read by the processor using a public key of a private public key pair;

compare the computed cryptographic signature for the manifest to an expected cryptographic signature for the manifest, wherein the expected cryptographic signature for the manifest was generated by the on-line application developer using a private key of the private public key pair; and detect the on-line application code modifications based on non-matching of the computed signature for the manifest and the expected signature for the manifest.

18. The system of claim 14, wherein the on-line application is stored in different segments of the memory and code for the on-line application is modified to include relocation fix-ups to reflect the different segments of the memory that the code for the on-line application is stored so that the on-line application can run from the different segments of memory, wherein when the instructions are executed by the processor they further cause the processor to read a manifest for the on-line application, wherein the manifest identifies the relocation fix-ups;

read the code for the on-line application;

back out the relocation fix-ups from the code for the on-line application;

compute a cryptographic signature for the code after the relocation fix-ups are backed out using a public key of a private public key pair;

compare the computed cryptographic signature for the code to an expected cryptographic signature for the code, wherein the expected cryptographic signature for the code was generated by the on-line application developer using a private key of the private public key pair; and detect the on-line application code modifications based on non-matching of the computed signature for the code and the expected signature for the code.

19. The system of claim 14, wherein the on-line application includes process flows to external code segments, and wherein when the instructions are executed by the processor they further cause the processor to detect cheating in use of the on-line application by detecting on-line application process flow modifications, wherein the on-line application process flow modifications are detected by reading a manifest for the on-line application, wherein the manifest identifies the external code segments defined in the process flow for the on-line application;

reading the external code segments;

computing cryptographic signatures for the external code using a public key of a private public key pair;

comparing the computed cryptographic signatures for the external code to expected cryptographic signatures for the external code segment, wherein the expected cryptographic signature for the external code segment was generated using a private key of the private public key pair; and detecting the on-line application process flow modifications based on non-matching of the computed signature for the external code and the expected signature for the external code.

20. The system of claim 14, wherein when the instructions are executed by the processor they further cause the processor to detect cheating in use of the on-line application by detecting activation of an interrupt handler during use of the on-line application, wherein the activation of the interrupt handler is detected by receiving interrupt reports;

analyzing the interrupt reports to determine if any interrupt handlers have been activated;

gathering data about an activated interrupt handler, including at least some subset of, what interrupt handler is activated and is the on-line application being processed by the interrupt handler; and reporting the data to the remote service provider.

* * * * *